United States Patent [19]
Yamazaki

[11] Patent Number: 5,577,162
[45] Date of Patent: Nov. 19, 1996

[54] DYNAMIC PROGRAMMING MATCHING SYSTEM FOR SPEECH RECOGNITION

[75] Inventor: Yasushi Yamazaki, Kawasaki, Japan

[73] Assignee: Fujitsu Limited, Kawasaki, Japan

[21] Appl. No.: 320,380

[22] Filed: Oct. 11, 1994

Related U.S. Application Data

[63] Continuation of Ser. No. 916,263, Jul. 21, 1992, abandoned.

[30] Foreign Application Priority Data

Jul. 26, 1991 [JP] Japan ................................. 3-187157

[51] Int. Cl.[6] ................................................ G10L 5/00
[52] U.S. Cl. ............................................... 395/2.41
[58] Field of Search ........................ 381/41, 43; 395/2.41

[56] References Cited

U.S. PATENT DOCUMENTS

| | | | |
|---|---|---|---|
| 4,059,725 | 11/1977 | Sakoe | 381/43 |
| 4,467,437 | 8/1984 | Tsuruta et al. | 381/43 |
| 4,488,243 | 12/1984 | Brown et al. | 364/513.5 |
| 4,763,278 | 8/1988 | Rajasekaran et al. | 381/43 |
| 4,975,962 | 12/1990 | Oka | 381/43 |
| 5,067,166 | 11/1991 | Ito | 382/37 |
| 5,121,465 | 6/1992 | Sakoe | 395/2 |
| 5,201,004 | 4/1993 | Fujiwara et al. | 381/46 |

*Primary Examiner*—Allen R. MacDonald
*Assistant Examiner*—Vijay Chawan
*Attorney, Agent, or Firm*—Staas & Halsey

[57] ABSTRACT

A dynamic programming or DP matching system for speech recognition. Upon DP matching, cumulative distance is compared with a threshold value at every sampling time point of a speech pattern to thereby restrict the number of DP paths in succeeding matching processes. The number of DP paths remaining at each speech pattern sampling time point is monitored by a monitoring module for altering a threshold value so as to decrease the number of the DP paths. When DP path number becomes excessively large, the threshold is increased to thereby decrease the DP path number. Capacity of a DP data storing memory can be reduced while preventing the matching capability from being lowered.

8 Claims, 12 Drawing Sheets

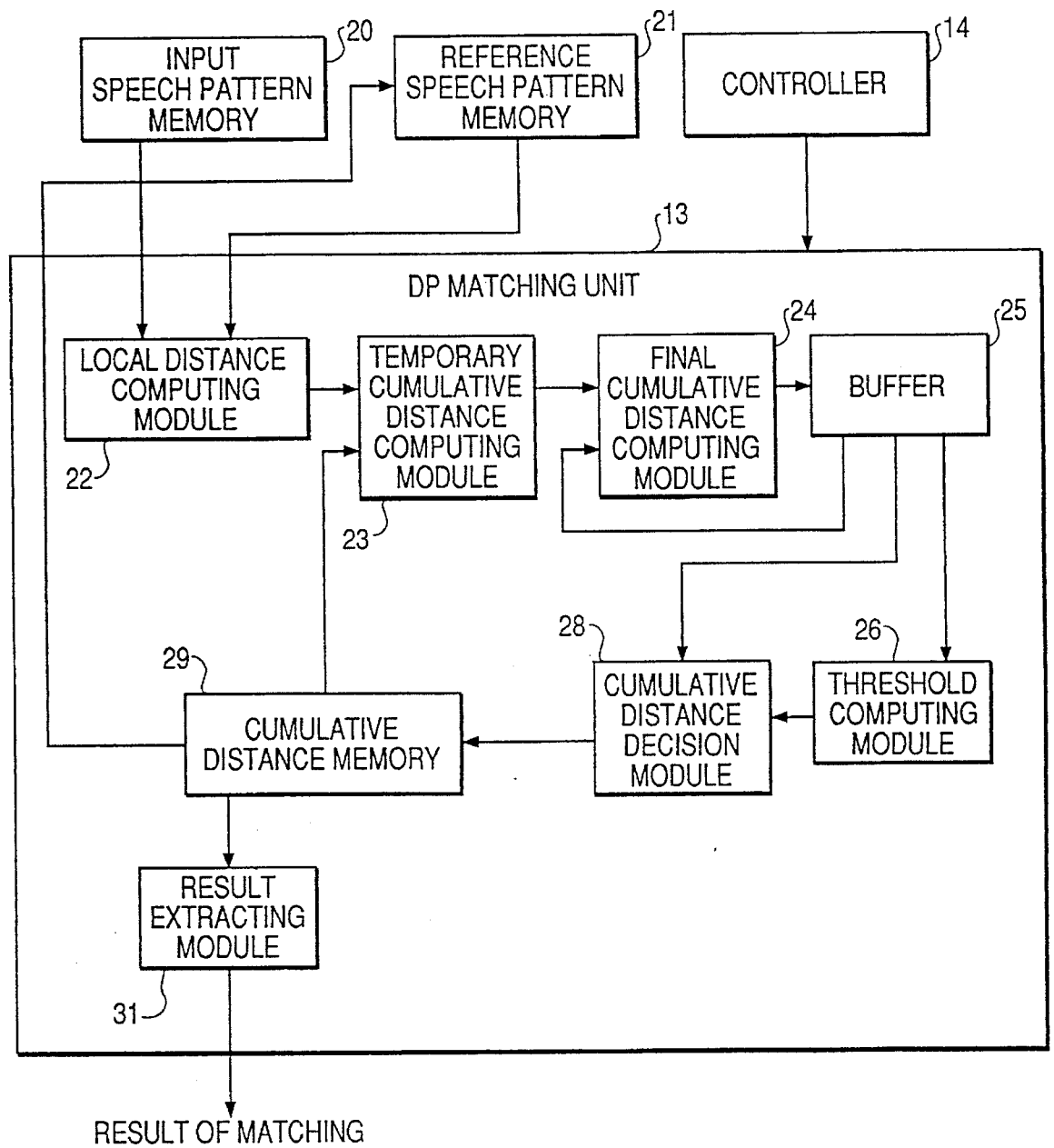

DYNAMIC PROGRAMMING MATCHING SYSTEM FOR SPEECH RECOGNITION

This application is a continuation of application Ser. No. 07/916,263, filed Jul. 21, 1992, now abandoned.

BACKGROUND OF THE INVENTION

1. Field of the Invention

The present invention relates generally to a speech recognition system in which a speech matching process based on a dynamic programming process hereinafter "DP" is adopted. More particularly, the invention is concerned with a dynamic programming or DP matching system for speech recognition which enjoys an improved or enhanced matching capability while allowing use of a memory of reduced capacity for storing DP data as a result of optimization by DP path pruning techniques.

2. Description of the Prior Art

One of the most fundamental and successful concepts in speech recognition is that of nonlinearly time-aligning an unknown input utterance pattern with reference patterns stored previously. Such approaches, however, result in path finding problems. In the case of continuous speech recognition, there is typically a huge number of possible paths which require a careful organizational plan. For a small search space as in connected word recognition, for example, a dynamic programming (DP) algorithm provides an efficient technique of performing a search in combination with a pruning strategy. However, such a DP approach and application to a large search space can lead to computationally significant overhead and expense because of a huge number of computational paths along which computations have to be performed during matching.

As such, there have been proposed but a few approaches for reducing the number of DP paths. One such approach will be addressed here in some detail to allow a better understanding of the background of the present invention. Reference will be made reference to FIGS. 10 to 13 of the accompanying drawings, in which, FIG. 10 is a functional block diagram which illustrates the concept underlying a dynamic programming or DP matching system for speech recognition known heretofore, FIG. 11 depicts a DP path pruning method which the present invention also concerns. FIG. 12 is a block diagram which depicts a structure of a DP matching system for speech recognition. FIG. 13 is a flow chart for which illustrates DP matching processing executed by the system depicted in FIG. 12.

Referring now to FIG. 10, in the DP matching system for speech recognition, speech feature vectors (also referred to simply as features) are extracted from input utterances in the form of time-serial input speech patterns by a time serial pattern reading module 10 to be stored in a time-serial input speech pattern storage module 11. Subsequently, these time serial input speech patterns are matched with standardized time-serial reference speech patterns stored previously in a reference speech pattern storage module 12 through a dynamic programming or DP matching process. As a result of DP matching each reference speech pattern has a minimum cumulative distance value from the corresponding input speech pattern and is outputted as the result of the matching.

More specifically, let's assume $a_i$ a series of speech features sampled or extracted sequentially at a series of discrete sampling time points, respectively. These speech features $a_i$ are stored in the time-serial input speech pattern memory 11 through the speech pattern extracting module 10, whereon local inter-pattern distances d(i, j) between the speech features $a_i$ represented by the time-serial input speech patterns and reference features $b_j$ of the time serial reference speech patterns mentioned above are determined. On the basis of the local inter-pattern distances d(i, j), cumulative distances G(i, j) are computed in accordance with the following formulas $$G(1, 1)=d(1, 1), G(i, j)=d(i, j)+\min \{G(i-1, j), G(i-1, j-1)\} \quad (1)$$

Subsequently, an optimal path is selected from all the possible DP paths on the basis of the cumulative distances G(i, j).

FIG. 11A is a diagram which schematically illustrates paths for computing cumulative distances in which the time axis of the input speech patterns is taken along the abscissa with the time axis of the reference speech patterns being taken along the ordinate. Methods have been proposed for limiting the DP path computation at each succeeding sampling time point $i$. One of such methods is illustrated in FIG. 11B. According to this method, the DP paths are computed only for the cumulative distances G(i-1, j) and G(i-1, j+3) which are smaller than a given threshold value at a time point (i-1). Consequently, at the succeeding time point $i$, the cumulative distance G(i, j+2) is not computed as indicated by a cross mark "x" in FIG. 11B. In this manner, overhead involved in the DP path computation can correspondingly be reduced, which in turn, means that the number of cumulative distances to be stored at successive time points can significantly be reduced. As such, the capacity of a cumulative distance memory for storing the cumulative distance data for the DP path computation can correspondingly be reduced.

A structure of a speech pattern matching system implemented on the basis of the concept explained above is shown in FIG. 12 while the processing performed by the system is illustrated in the flow chart depicted in FIG. 13.

Let's assume by G(i-1, k) a k-th cumulative distance value of those remaining as stored in the cumulative distance memory 29 as the candidates for the DP paths at a preceding sampling time point (i-1) while representing by JP(k) a feature identifying number of the corresponding reference speech pattern.

Referring now to FIG. 13 in combination with FIG. 11, at steps (1) and (2), the variables $i$ and $k$ for the input speech pattern and the reference speech pattern are initialized.

In a succeeding step (3), a path along which computation is to be performed is selected.

In a step (4), a local distance d(i, j) is computed by a local distance computing module 22 shown in FIG. 12.

Subsequently, in a step (5), one of temporary or candidate cumulative distances g(i, j) is determined by a temporary cumulative distance calculating module 23 in accordance with the following formula which can be developed from the aforementioned expression (1). Namely, $$G(i, j)=\min \{d(i, j)+G(i, j), d(i, j)+G(i, j-1)\}$$

In a step (6), the temporary cumulative distance. g(i, j) thus determined is compared with the other temporary cumulative distance when the latter has already been determined. The smaller distance is selected as the final cumulative distance G(i, j). Unless the other temporary cumulative distance is determined yet, the first mentioned temporary cumulative distance is stored in a buffer 25 as the final cumulative distance G(i, j).

Upon completion of computation of all the possible paths through a loop of steps (7) and (8), the processing proceeds to a next step (9). In step (9), a threshold value θ(i) is calculated by a threshold computing module 29, for example, in accordance with $$\theta(i)=\min \{G(i, j)\}+\lambda$$

where λ represents an allowance value added to the minimum cumulative distance at each of the discrete time points.

In a step (10), a counter reserved in the buffer 25 is initialized.

By executing processing steps (11) to (14), the cumulative distances smaller than the threshold value are selected from those stored in the buffer 25 by a cumulative distance decision module 28 and stored in a cumulative distance memory 29.

Upon completion of the computations of the cumulative distances for all the input speech patterns through the loop including steps (15) and (16), a final result of the matching process is outputted from a result extracting module 31.

SUMMARY OF THE INVENTION

As will be appreciated from the above description, in the speech recognition pattern matching system known heretofore, overhead involved in DP matching computation is considerably reduced by pruning the DP paths through comparison of the cumulative distance values with the threshold value every time the speech pattern is inputted.

It is however noted that because the number of DP paths are not constant, there arises a problem mentioned below notwithstanding reduction in the number of the DP paths.

In particular, when a memory of a small capacity is employed as the cumulative distance memory 29, the memory capacity becomes insufficient when an excessively large number of the candidates for the DP path for an input speech pattern are available, giving rise to occurrence of overflow in the memory. To the contrary, when the number of the candidates for the DP path for an input speech pattern is very small, the number of the DP paths which can be used for the subsequent matching computation becomes too small to ensure a satisfactory matching accuracy.

It is therefore a primary object of the present invention to provide a dynamic programming matching system for speech recognition which can evade problems of the prior art systems and in which a memory for storing the DP path candidates can be utilized with a high efficiency while preventing the capability or performance of the matching system from being degraded.

In view of the above and other objects which will become apparent as the following description proceeds, there is provided according to an aspect of the invention a dynamic programming matching system for speech recognition which comprises a time-serial input speech pattern extracting module, a time-serial input speech pattern memory, a time-serial reference speech pattern memory, a DP matching module for computing optimal cumulative values for interpattern distances between the input time-serial speech patterns and the stored time-serial speech reference patterns, respectively. Additionally, the system indodes a control module for controlling the dynamic programming process, wherein the cumulative value for each input speech pattern is compared with a threshold value to thereby restrict the number of DP paths for subsequent computation. The system is characterized in that the system further includes a monitoring module for monitoring a number of DP paths remaining at every time point a speech pattern is inputted, and a threshold value altering module for changing or modifying the threshold value in dependence on the number of the DP paths.

In a preferred mode of carrying out the present invention, it is proposed to implement the threshold value altering module so as to change the threshold value in dependence on a relation between the number of DP paths for the speech pattern inputted at a preceding time point as monitored by the monitoring module and the number of the DP paths at a current time point.

In another preferred mode of carrying out the present invention, it is proposed to implement the DP matching module such that after alteration of the threshold value by the threshold value altering module, computation is again performed for determining the DP path under the control of the control module.

In yet another mode for carrying out the invention, the threshold value altering module can be designed so that a threshold value at a succeeding time point is changed on the basis of the threshold value at a current time point and a change which the threshold value at the current time point is to undergo.

In a further preferred mode for carrying out the invention, the threshold value altering module may be designed so as to change the threshold value at time points along the time axis of the time-serial reference speech patterns.

The above and other objects, features and advantages of the present invention will become apparent upon reading the detailed description of the preferred embodiments which follows and by reference to the drawings showing the same.

BRIEF DESCRIPTION OF THE DRAWINGS

FIG. 12 is a block diagram showing a structure of a prior art DP matching system for speech recognition.

DESCRIPTION OF THE PREFERRED EMBODIMENTS

Figure 1:
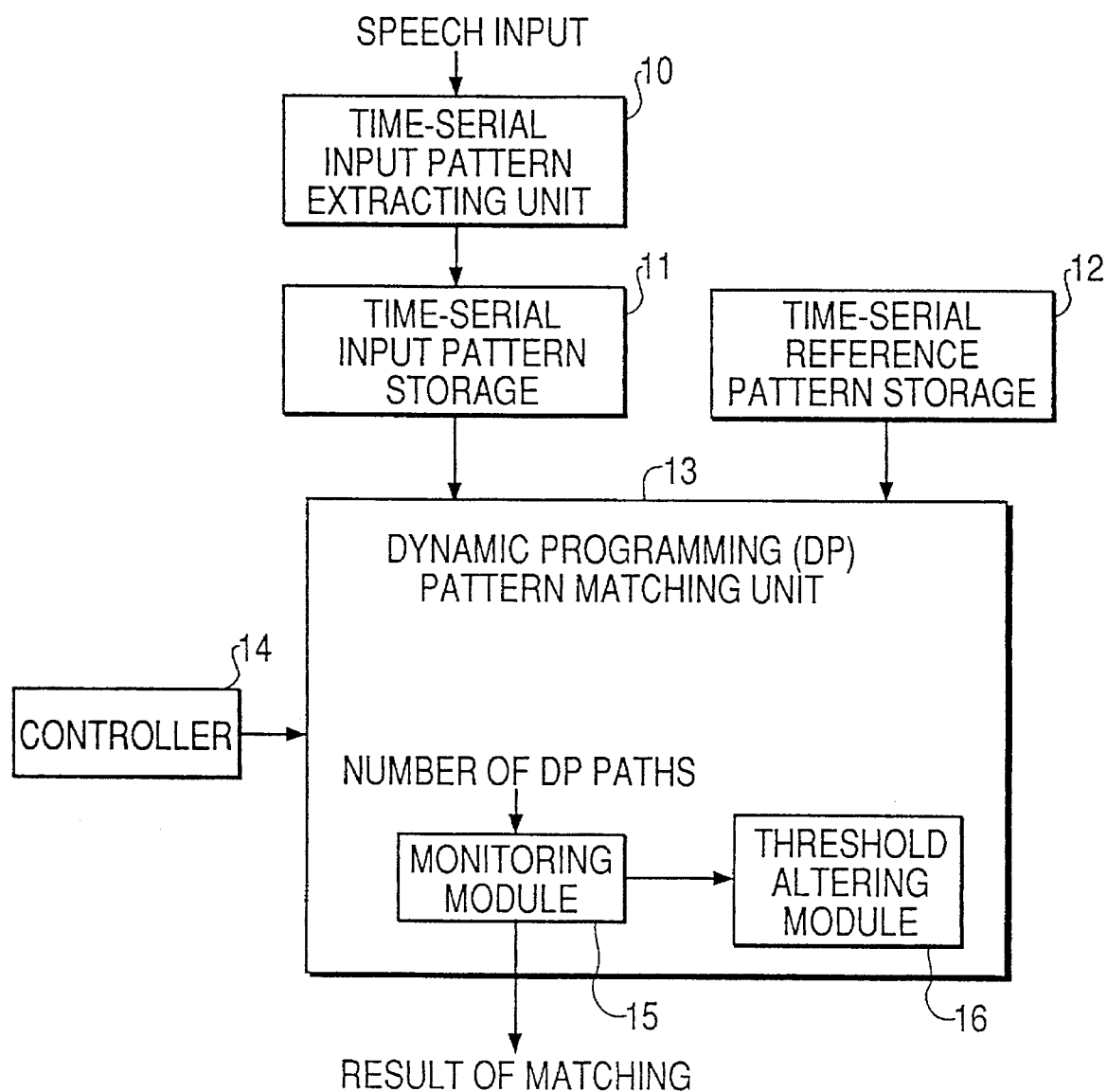
FIG. 1 is a schematic block diagram for illustrating the concept underlying the DP matching system for speech recognition according to the present invention.

Now, the present invention will be described in detail in conjunction with preferred or exemplary embodiments by referring to the drawings.

FIG. 1 is a block diagram for illustrating the concept underlying the present invention, utterance or speech is sampled into time-serial speech patterns representing feature vectors of the speech by means of a time-serial input speech pattern extracting unit 10 to be subsequently stored in a time-serial input pattern memory 11. On the other hand, time-serial reference patterns which serve as references for DP matching with the input speech patterns are stored in a time-serial reference speech pattern memory 12. A DP matching unit 13 serves for computing optimal cumulative distances between the input speech patterns and the reference patterns at the input speech sampling time points on the basis of a dynamic programming or DP method under the control of a control unit 14.

The DP matching unit 13 compares the cumulative distance value with a threshold value at each sampling time point to thereby limit the number of succeeding DP computation paths for the purpose of reducing overhead involved in computation under the control of the control unit 14. To this end, the DP matching unit 13 includes a monitoring module 15 for monitoring the number of DP paths remaining at each sampling time point and a threshold value altering module 16 for altering or changing the threshold value mentioned hereinbefore based on the number of the remaining DP paths.

For realizing the alteration or change of the threshold value, the measures mentioned below may be adopted.

In a preferred mode of carrying out the invention, the threshold value altering module 16 is arranged so as to alter or change the threshold value based on a relation between the number of DP paths at a preceding sampling time point and the number of DP paths at a current sampling time point; Both the points being detected by the monitoring module 15.

According to another aspect of the invention, the DP matching module 13 performs computation for determining the DP paths remaining at the time point when the threshold value is altered by the threshold value altering module 16.

According to a further aspect of the invention, the threshold value altering module 16 is implemented so as to alter the threshold value at a succeeding sampling time point on the basis of the threshold value at the current sampling time point and a change in the threshold value resulting from the alteration at the current sampling time point.

According to yet another aspect of the present invention, the threshold value altering module 16 is implemented so as to alter the threshold at each of time points along the time axis of the time-serial reference speech patterns.

The above-stated manner and, according to the teachings of the present invention, the number of candidates for the DP paths (i.e. values stored in the cumulative distance memory) is monitored at every discrete sampling time point and the threshold value is altered in dependence on the number of the candidates for the DP path for thereby controlling the DP path candidate number.

When the number of the candidates for the DP paths is excessively large, the threshold value is increased to thereby decrease the number of the DP path candidates. As a result, corresponding memory capacity can be reduced.

On the other hand, in case the DP path candidate number becomes excessively small, the threshold value is increased to thereby increase correspondingly the number of the DP path candidates. As a result, performance and accuracy of the matching operation can be improved or enhanced.

Figure 2:
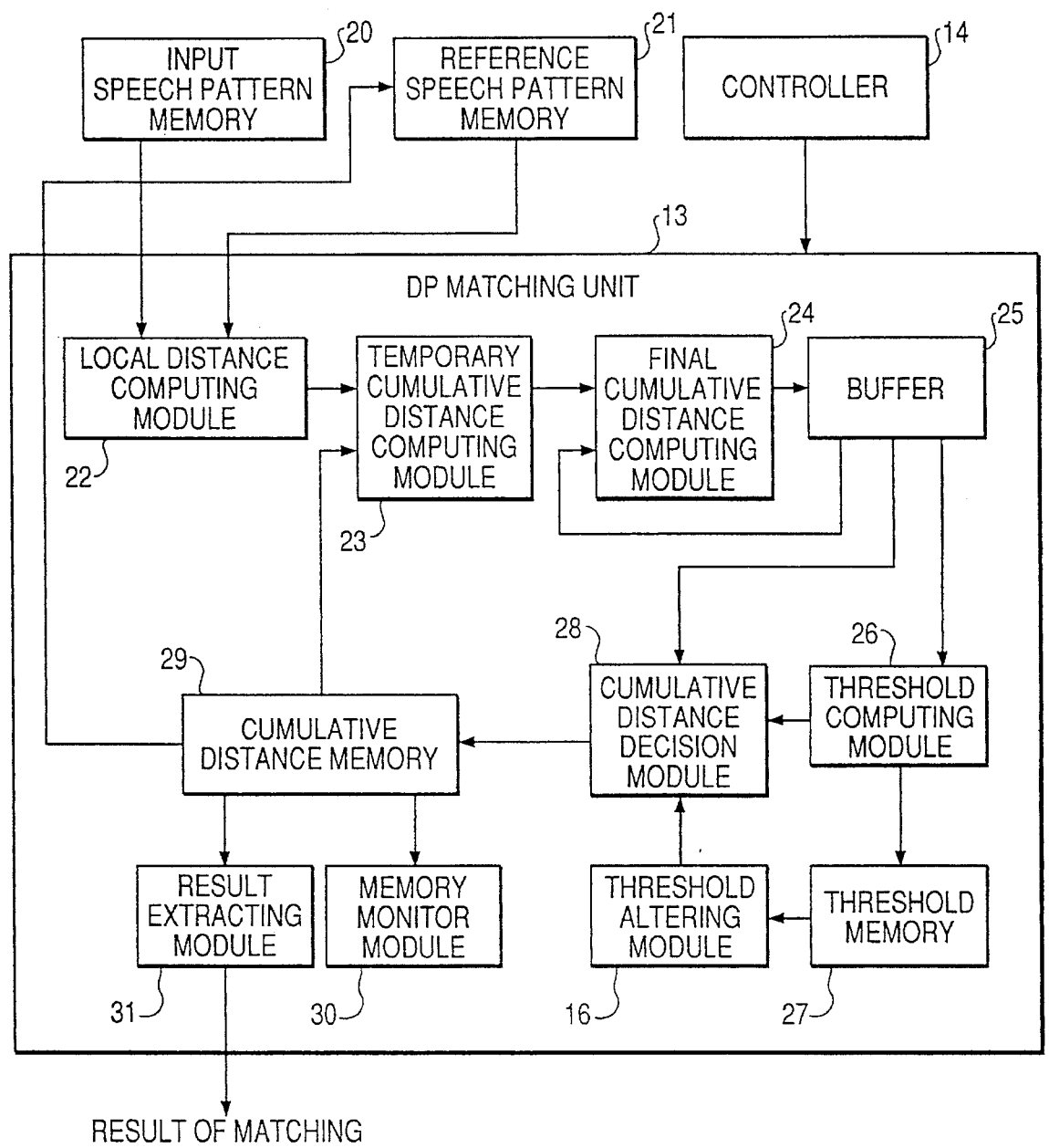
FIG. 2 is a block diagram showing a structure of the speech recognition DP matching system according to an embodiment of the invention.
Figure 3:
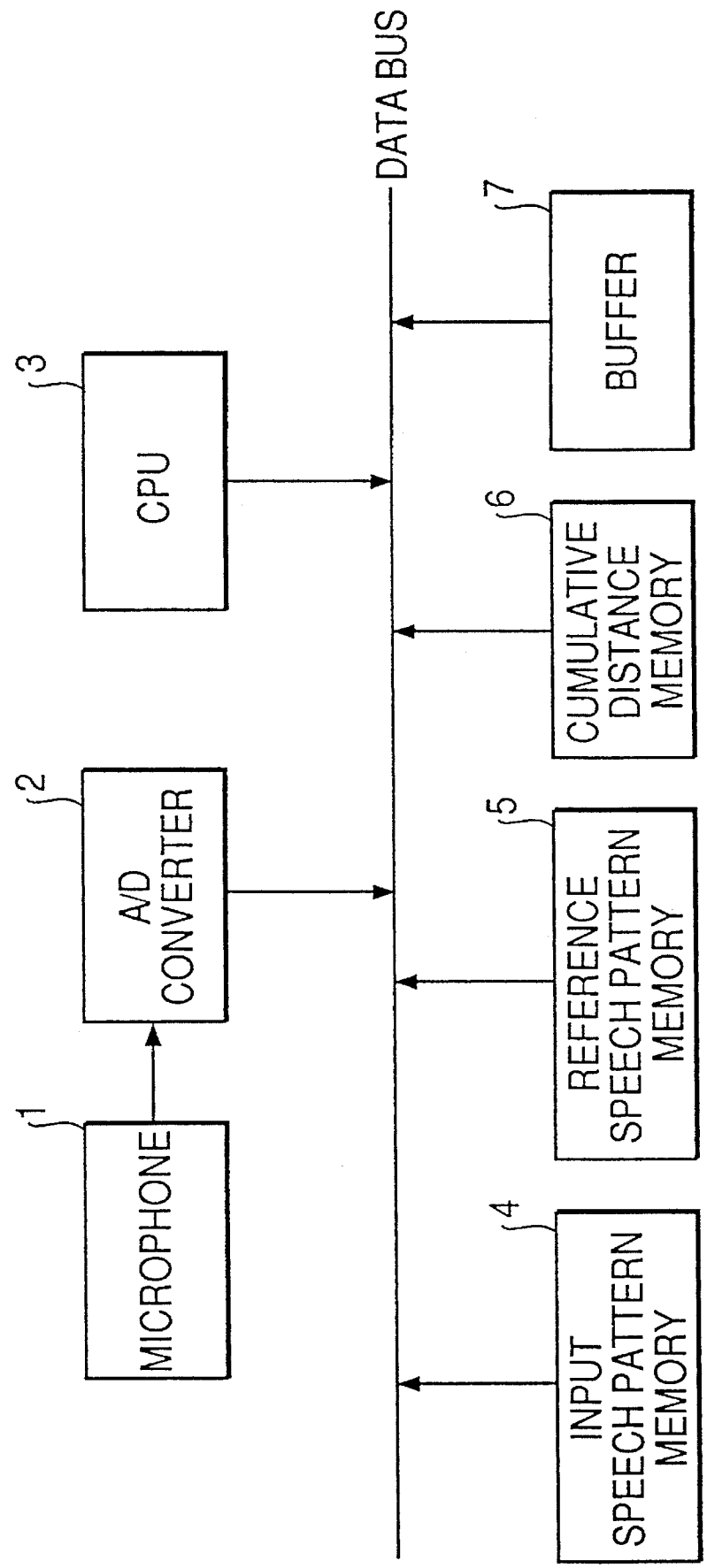
FIG. 3 is a schematic block diagram showing a hardware structure of the speech recognition DP matching system shown in FIG. 2.
Figure 4:
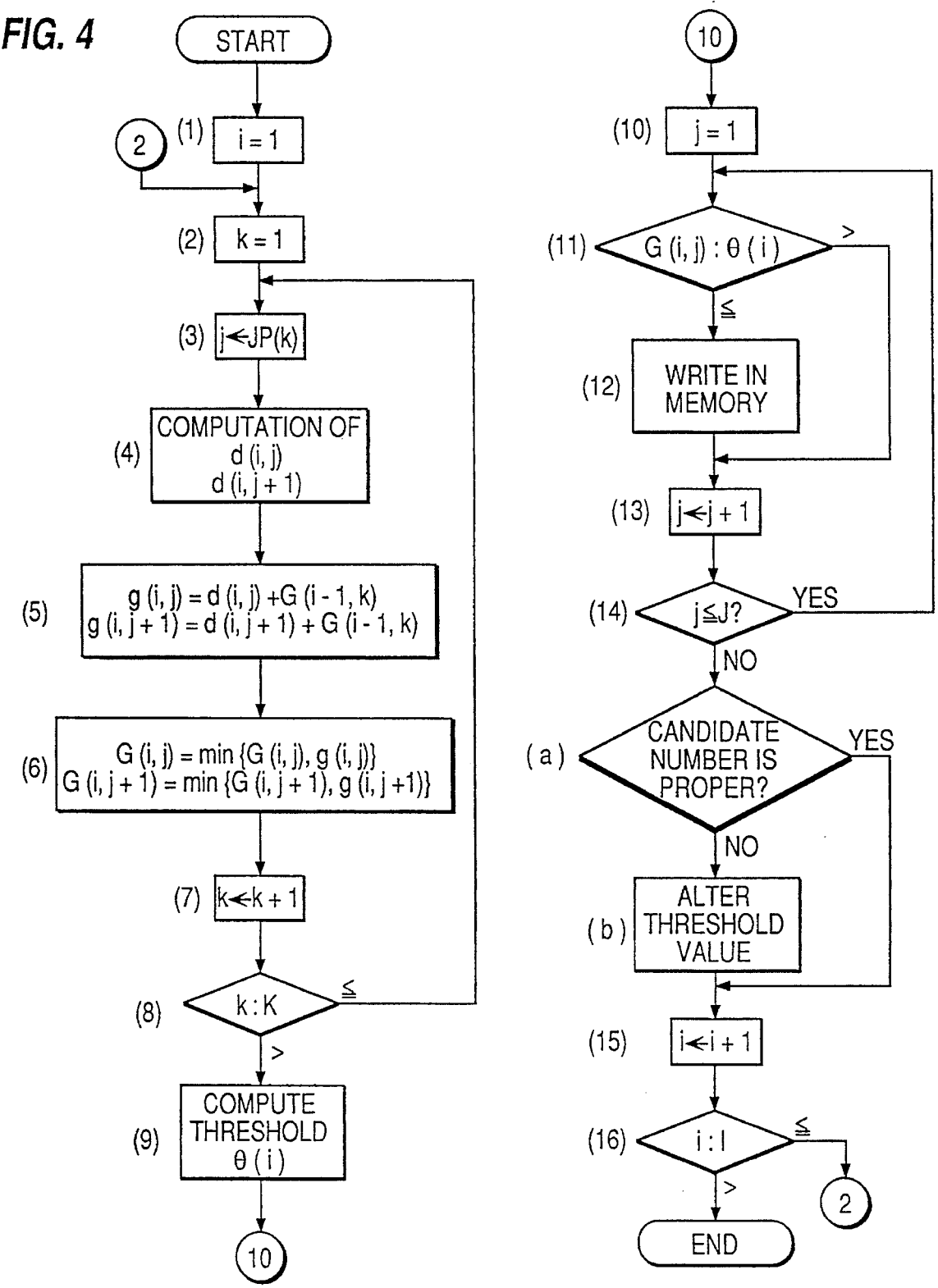
FIG. 4 is a flow chart for illustrating processing executed by the system shown in FIG. 2.

Referring now to FIG. 2, thereon depicted is a functional block diagram showing a general arrangement of the DP matching system for speech recognition, FIG. 3 depicts a hardware structure of the same, and FIG. 4 depicts a flow chart which illustrates the processes performed by the DP matching system shown in FIG. 2.

Referring again to FIG. 2, an input pattern memory 20 and a reference pattern memory 21 correspond to the time-serial input speech pattern memory 11 and the time-serial reference speech pattern memory 12 shown in FIG. 1, respectively. In FIG. 2, a reference numeral 22 denotes a local distance computing module for computing the local distance $d(i, j)$ mentioned above, a numeral 23 denotes a temporary cumulative distance computing module for computing the temporary computative distance $g(i, j)$ also mentioned above. Further, a numeral 24 denotes a final global distance computing module for computing the final or optimal cumulative distance $G(i, j)$. A buffer 25 serves as a memory for temporarily storing the final cumulative distance $G(i, j)$.

A reference numeral 26 denotes a threshold value computing module for computing the threshold value $\theta(i)$ which serves as a reference for reducing or increasing the number of the DP path candidates. The threshold value $\theta(i)$ is stored in a threshold memory 27. The threshold value altering module 16 performs a processing sequence to the threshold value $\theta(i)$ based on the number of the DP paths candidates. A cumulative distance decision module 28 compares the final cumulative distances $G(i, j)$ stored in the buffer 25 with the threshold value $\theta(i)$. The final cumulative distances $G(i, j)$ which are relatively shorter than the threshold value $\theta(i)$ are stored in the cumulative distance memory 29.

Reference numeral 30 denotes a memory monitoring module which corresponds to the monitoring module shown in FIG. 1 and serves to monitor the amount of data content of the cumulative distance memory 29 i.e., the number of the DP path candidates). A result extracting module 31 extracts a final result from the cumulative distance memory 29 to output it as the result of the matching process.

FIG. 3 is a block diagram showing a hardware structure corresponding to the system shown in FIG. 2. Utterance or speech is picked up by a microphone 1 and sampled by an analogue-to-digital (A/D) converter 2 to produce the time-serial input speech patterns which are stored in an input speech pattern memory 4. On the other hand, reference speech patterns prepared previously are stored in a reference speech pattern memory 5. A CPU (central processing unit) 3 performs speech analysis as well as pattern matching by computing the local distances between the input patterns and the reference patterns at successive sampling time points and then calculates the cumulative distances on the basis of the local distances. A cumulative distance memory 6 serves to store the cumulative distances used in the matching. A buffer 7 is employed for storing various data required for pattern matching. From the above description, correspondences between the individual components of the system shown in FIG. 2 and those shown in FIG. 4 will be understood.

Now, description will be made of processes which are performed by the speech recognition DP matching system with reference to FIG. 4 in combination with FIG. 1.

In steps (1) and (2), the variables i and k for the input speech patterns and the reference speech patterns are initialized.

In a succeeding step (3), a computational path selection is performed.

In a step (4), local distances d(i, j) between the input speech patterns and the reference speech patterns are determined by a local distance computing module 22 shown in FIG. 2.

Subsequently, in a step (5), one of temporary or candidate cumulative distances g(i, j) is determined by a temporary cumulative distance calculating module 23 in accordance with the undermentioned formulas which is developed from the expression (1) mentioned above in the background section of this specification patent document.

$$G(i, j) = \min \{d(i, j) + G(i, j), d(i, j) + G(i, j-1)\}$$

In a step (6), the temporary cumulative distance g(i, j) thus determined is compared with the other temporary cumulative distances when the latter have already been determined. The smaller of these distances is selected as the final cumulative distance G(i, j). Unless the other temporary cumulative distance are determined yet, the first mentioned temporary cumulative distance is stored in the buffer 25 as the final cumulative distance G(i, j).

Upon completion of the above-mentioned processing for of all the possible paths through a loop of processing steps (7) and (8), the processing proceeds to a next step (9).

In the step (9), a threshold value θ(i) is calculated by the threshold computing module 29, for example, in accordance with $$\theta(i) = \min \{G(i, j)\} + \lambda$$

where λ represents an allowance or slack value added to the minimum cumulative distance at each of the sampling time points.

In a step (10), a counter reserved in the buffer 25 is initialized.

By executing processing steps (11) to (14), the cumulative distances of values smaller than the above-mentioned threshold value are selected from those stored in the buffer 25 by the cumulative distance decision module 28 and stored in the cumulative distance memory 29.

In a step (a) succeeding to the step (14), A decision is made as to whether the number of the DP path candidates stored in the cumulative distance memory 29 is proper or not. When the answer to this decision step (a) is affirmative (YES), the succeeding step (b) is skipped. If otherwise, the step (b) is executed for altering the threshold value by the threshold value altering module 16. Thereafter the threshold stored in the threshold value memory 27 is updated, for example, as follows:

$$\theta(i) \leftarrow \theta(i) \times 0.9 \text{ or } \theta(i) \leftarrow \theta(i) \times 1.1$$

Upon completion of the DP path computations for all the input speech patterns through a loop including steps (15) and (16), a final result of matching is outputted from the result extracting module 31.

The following text describes the processing step (b).

According to a first aspect of the invention, it is taught to alter the threshold value by predicting the number of candidates for the DP paths at a succeeding time point on the basis of a relation between the DP path candidate number at a preceding sampling time point and the DP path candidate number at the current sampling time point. More specifically, representing the DP path candidate number at the preceding sampling time point by $N_{DP\text{-}pre}$, the DP path candidate number at the current sampling time point by $N_{DP\text{-}now}$ and the DP path candidate number at the succeeding sampling time point by $N_{DP\text{-}nxt}$, the last mentioned DP candidate number can be predicted in accordance with the following formula $$N_{DP\text{-}nxt} = N_{DP\text{-}now} + (N_{DP\text{-}now} - N_{DP\text{-}pre}).$$

The threshold value is then altered such that the number of the DP path candidates $N_{DP\text{-}nxt}$ at the succeeding time point will become neither excessively large nor excessively small.

The alteration of the value mentioned above exerts influence or the processing from the succeeding sampling time point. It will however be appreciated that in case the DP path candidate number is excessively small at the current time point, it is more preferable to increase the DP path candidates at the current sampling time point to thereby prevent the matching performance from degradation at an earlier time rather than increase the number of the DP path candidates from the succeeding sampling time point.

Figure 5A:
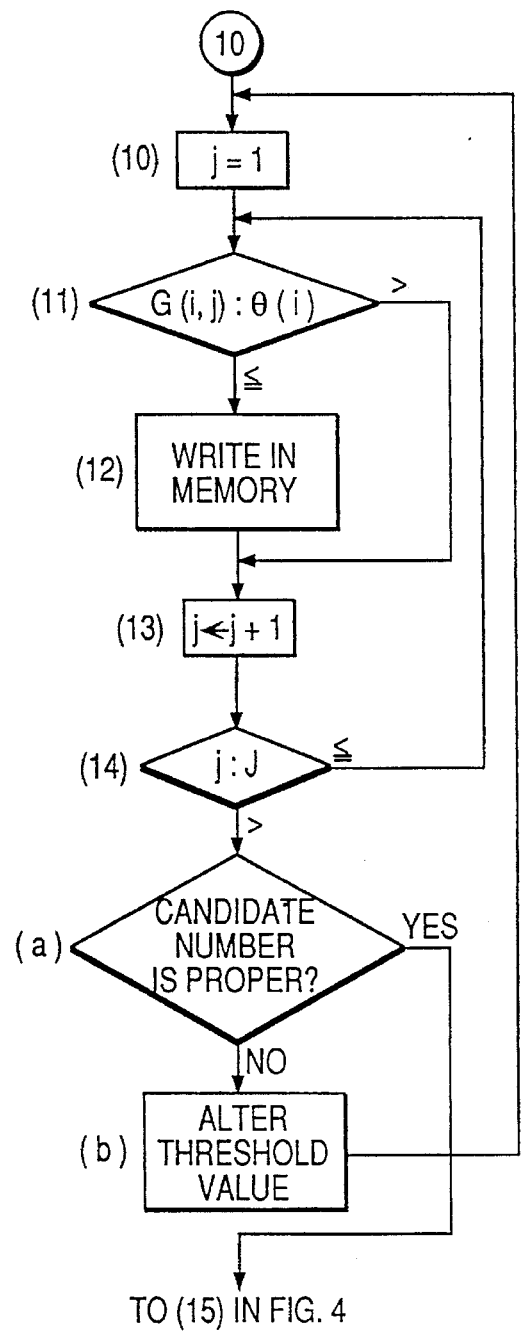
FIGS. 5A and 5B are flow charts for illustrating modifications, respectively, of the processing flow shown in FIG. 4 according to further embodiments of the invention.

Thus, it is preferred according to a second aspect of the present invention to modify a routine of the processing flow shown in FIG. 4 which includes the steps (10) to (14) and the steps (a) and (b) to such a routine as shown in FIG. 5A, in which after the threshold value alteration step (b), the step (10) is regained to execute again this routine.

Figure 5B:
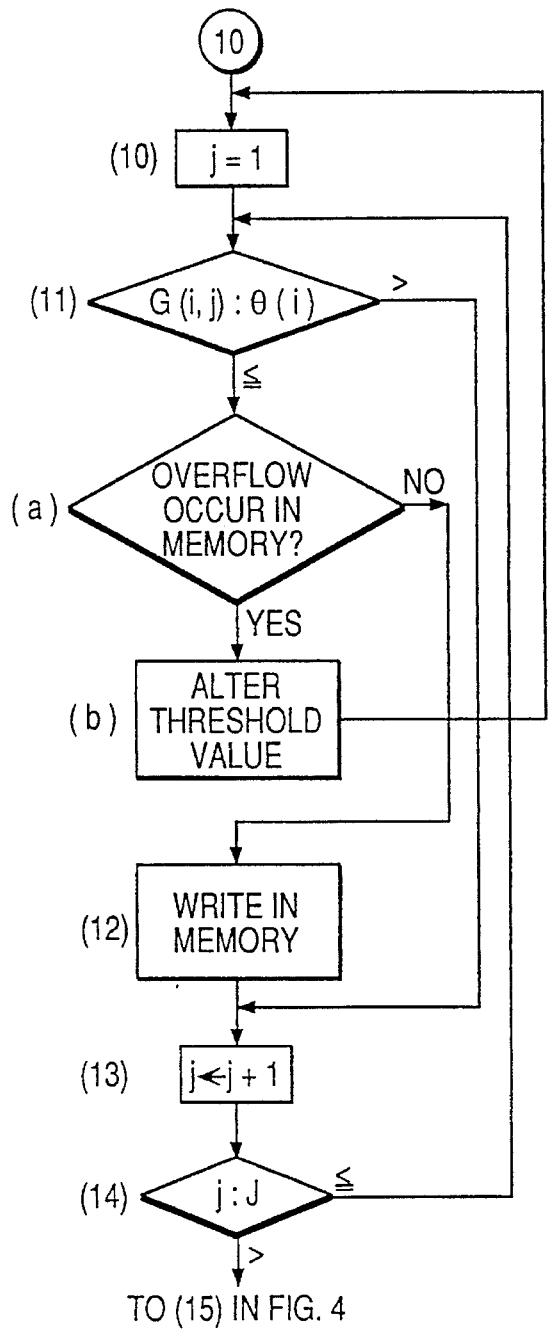

In the routine shown in FIG. 5A, an overflow may take place in the cumulative distance memory 29 when the DP path candidate number becomes excessively large. Thus, it is preferred according to a third aspect of the invention to constantly monitor the occurrence of the overflow in the cumulative distance memory 29 prior to writing data therein to thereby increase the threshold value upon detection of the overflow. This computation is performed again at the same sampling time point. Modification of the aforementioned processing is illustrated in FIG. 5B. The remaining processing steps are same as those shown in FIG. 4.

In the case of the modified processing described just above, the altered threshold value is assumed to be restored to the original value (i.e. value before alteration) at the succeeding step. Assuming that the threshold value is given, for example, by $$\theta(i) = \min \{G(i, j)\} + \lambda$$

which represents a sum of the minimum cumulative distance at a given sampling time point and a predetermined allowance λ, alteration of the threshold value θ(i) can be realized as follows:

$$\lambda' \leftarrow \lambda \times 0.9$$

As such, it is taught according to a fourth aspect of the invention that in place of using the allowance λ as it is at the succeeding sampling time point as taught according to the third aspect of the invention, the allowance λ to be used at the succeeding sampling time point is initialized as follows:

$$\lambda \leftarrow \lambda'/0.9$$

Figure 6:
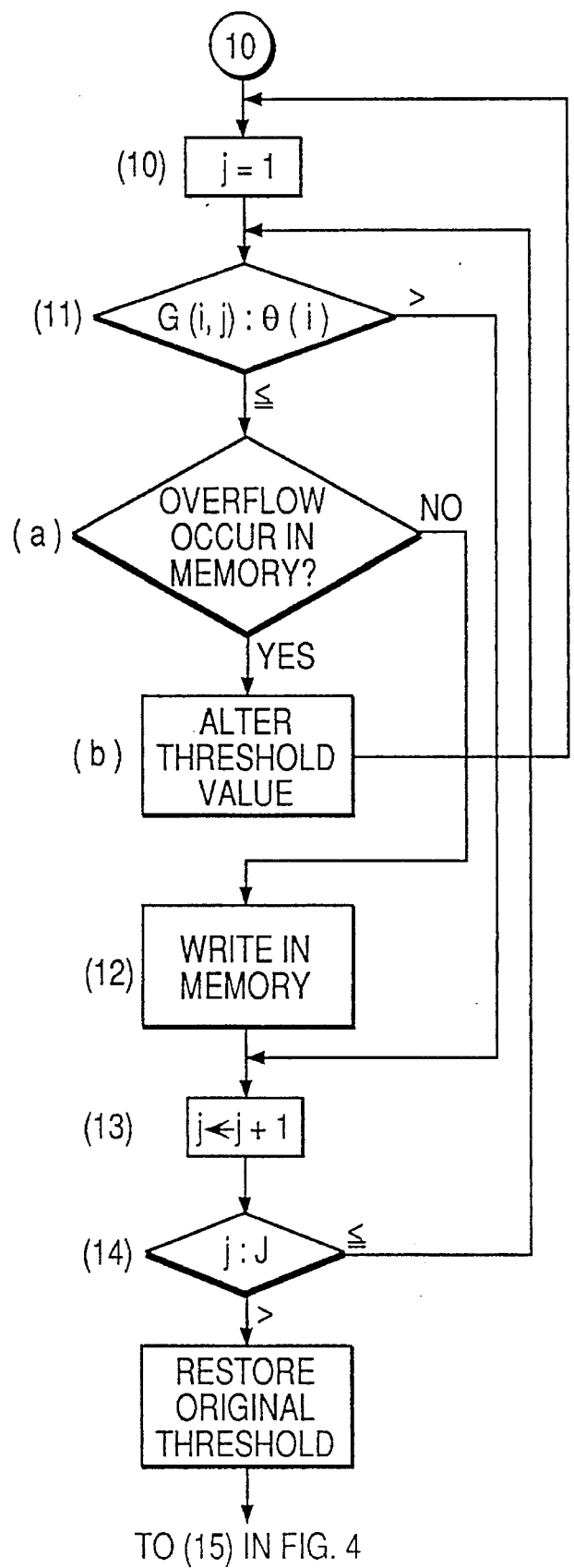
FIG. 6 is a flow chart for illustrating another modification of the processing flow shown in FIG. 4 according to another embodiment of the invention.

Thus, computation can be performed on the same condition throughout a series of sampling time points. Parenthetically, initialization of λ can be realized by storing the value of λ before alteration of the threshold value in the threshold memory 27 shown in FIG. 2. A corresponding flow-chart is illustrated in FIG. 6.

Further, according to a fifth aspect of the present invention, it is taught that instead of restoring the value of the threshold to the original value as it is, as described above in conjunction with the fourth aspect of the invention, the threshold value is modified in consideration of the change in the threshold value at the current sampling time point. For example, let's assume that upon alteration of the threshold value at the current sampling time point, the allowance value is changed as follows:

$$\lambda' \leftarrow \lambda \times 0.9$$

In such a case, the change in the threshold value at the current time point is given by $$\Delta\lambda = \lambda - \lambda'.$$

Accordingly, upon restoration of the threshold to the original value, it is taught by the present invention to modify the allowance value as follows:

$$\lambda \leftarrow \lambda'/0.9 - \Delta\lambda/22$$

Figure 7:
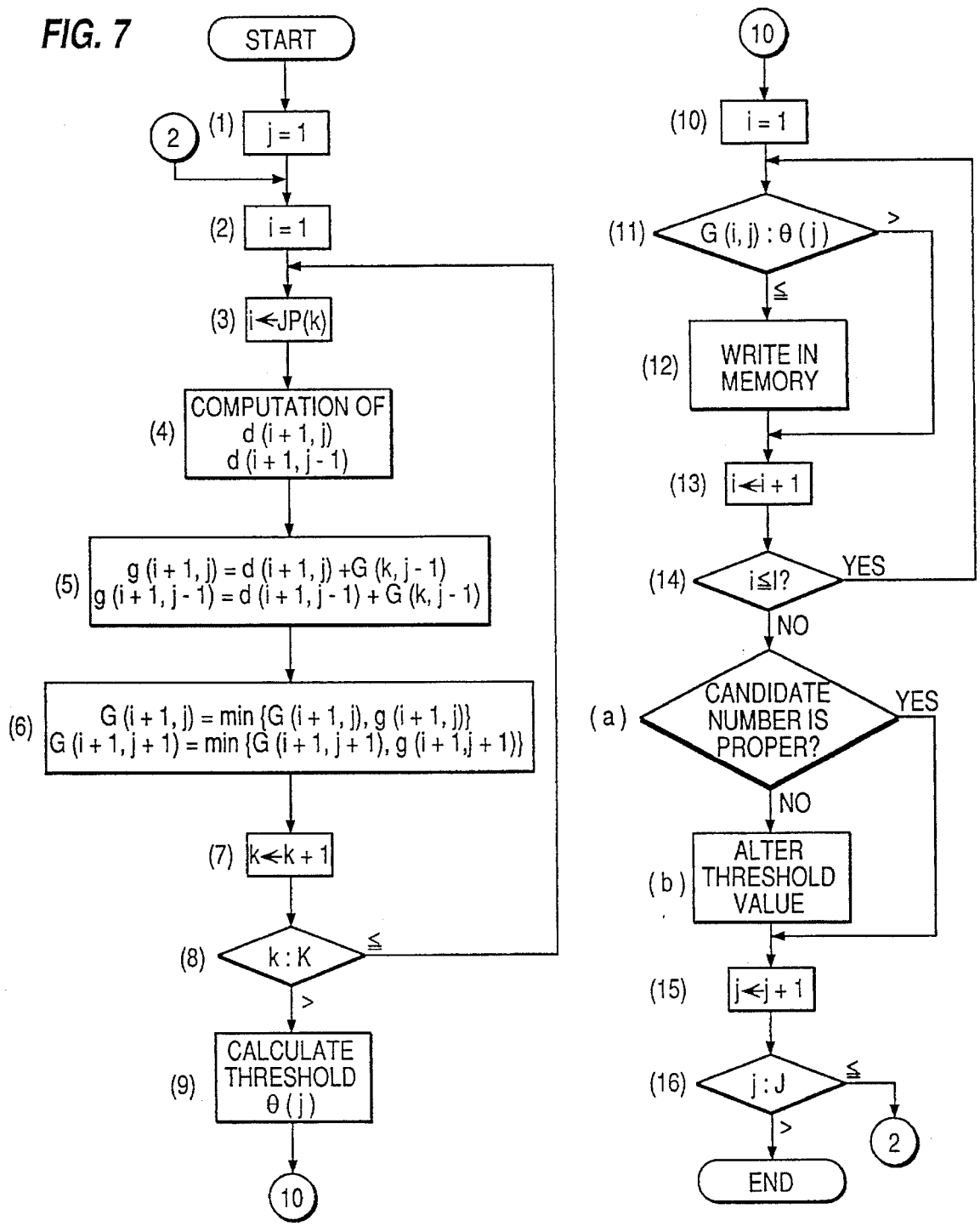
FIG. 7 is a flow chart for illustrating yet another modification of the processing flow shown in FIG. 4 according to a still further embodiment of the invention.

Further, it is taught according to a sixth aspect of the invention to alter the threshold value at time points along the time axis of the reference speech patterns instead of altering the threshold value at the sampling time points of the input speech patterns. This processing will be described below by reference to FIG. 7.

In steps (1) and (2), initialization is performed for the input speech patterns and the reference speech patterns.

In a step (3), computational path selection is performed.

Subsequently, through a routine including steps (4) and (6), the local distances, the temporary cumulative distances and the final cumulative distances are computed in a similar manner as described hereinbefore by reference to FIG. 2.

Results of the computation are stored in the buffer 25 (see FIG. 2).

Through steps (9) and (10), the threshold value is computed to be placed in a counter secured in the buffer.

Through steps (11) to (14), those of the cumulative distances stored in the buffer 25 which are smaller than the threshold value are transferred to the cumulative distance memory 29.

In a step (a), a decision is made as to whether the number of candidates for the DP path is proper or not.

In a step (b), the threshold value is altered when the answer of the decision in step (a) is negative.

Upon completion of the computation for all the input patterns, there can be obtained a final result of the matching.

FIGS. 8A to 8C and FIG. 9A to 9C graphically illustrate changes in the number of candidates by the DP path for explaining the effects attainable with the illustrated embodiments of the present invention.

Figure 8A:
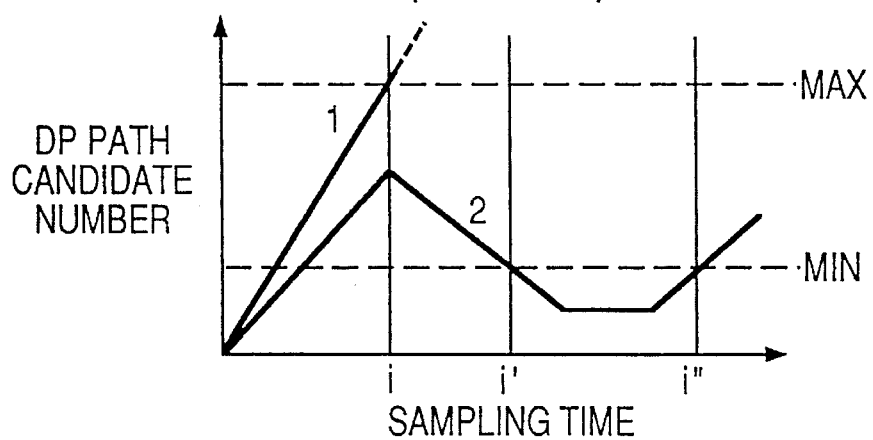
FIG. 8A is a diagram for illustrating how the number of DP path candidates changes according to a prior art method.

More specifically, FIG. 8A illustrates relationships between the sampling time points and the DP path candidate number in the case of prior art speech recognition DP matching systems. A curve 1 shows that the DP path candidate number exceeds the memory capacity MAX at a time point $\underline{i}$. On the other hand, a curve 2 shows that the DP path candidate number becomes excessively small during a time span between $\underline{i'}$ and $\underline{i''}$, indicating degradation in the matching performance and/or accuracy.

Figure 8B:
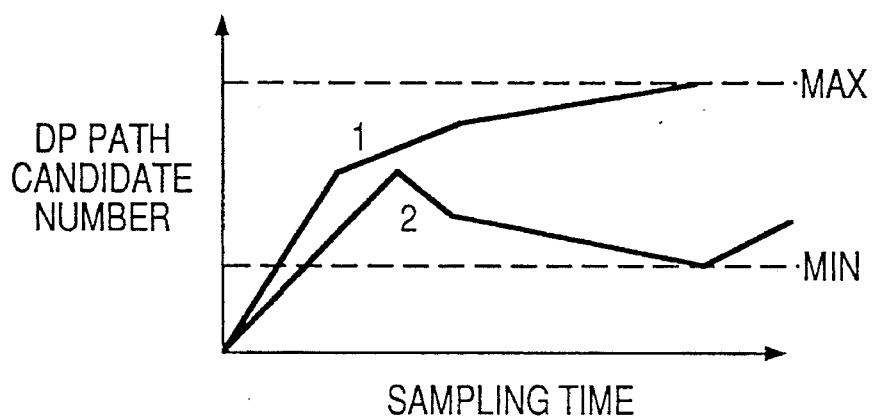
FIGS. 8B and 8C and FIGS. 9A and 9B are diagrams for illustrating graphically how the number of DP path candidates can be changed according to the embodiments of the invention.
Figure 8C:
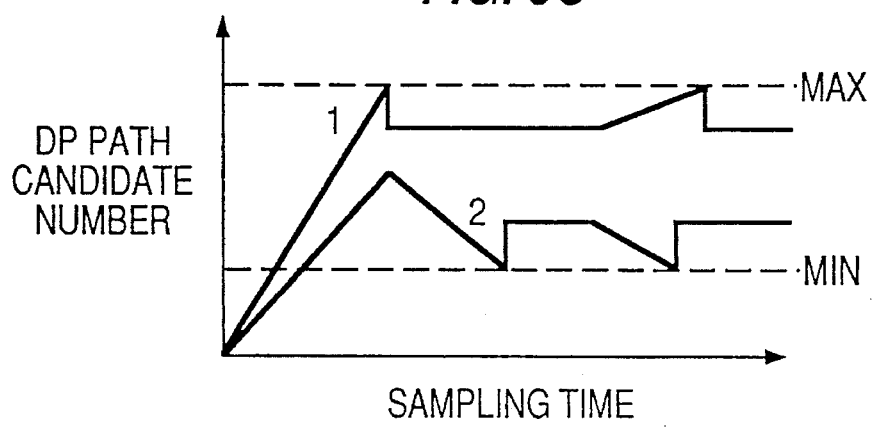

In contrast, in the case of the embodiment embodying the first aspect of the invention, the DP path candidate number varies as shown in FIG. 8B by virtue of the prediction of the DP path candidate number at the succeeding sampling time point.

At this juncture, it should be mentioned that the matching efficiency is improved as the DP path candidate number approaches to either the MAX level or the MIN level. That is when the candidate number is close to the value MAX (upper performance limit), this means that the memory is used with high efficiency and will result in improved matching performance. On the other hand, when the candidate number is close to the level MIN (lower performance limit), overhead involved in processing can be reduced without incurring degradation in matching performance.

In the case of the embodiments according to the second and third aspects of the invention, the threshold level is modified only when the DP path candidate number increases beyond or decreases below the border lines MAX or MIN. As such, memory utilization efficiency can be enhanced with overhead of the processing being reduced when compared with the embodiment according to the first aspect of the invention.

Figure 9A:
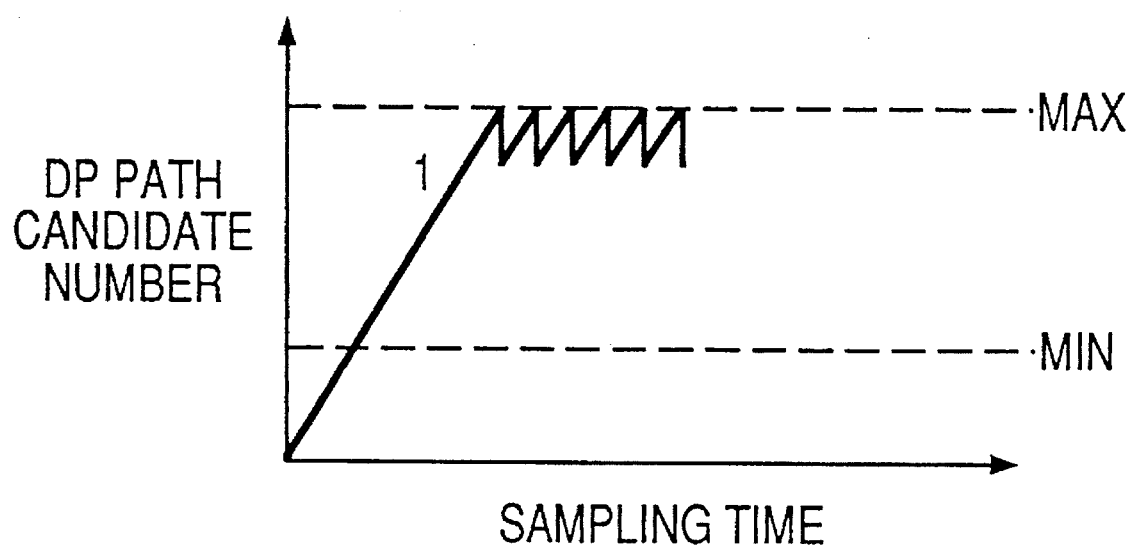
Figure 9B:
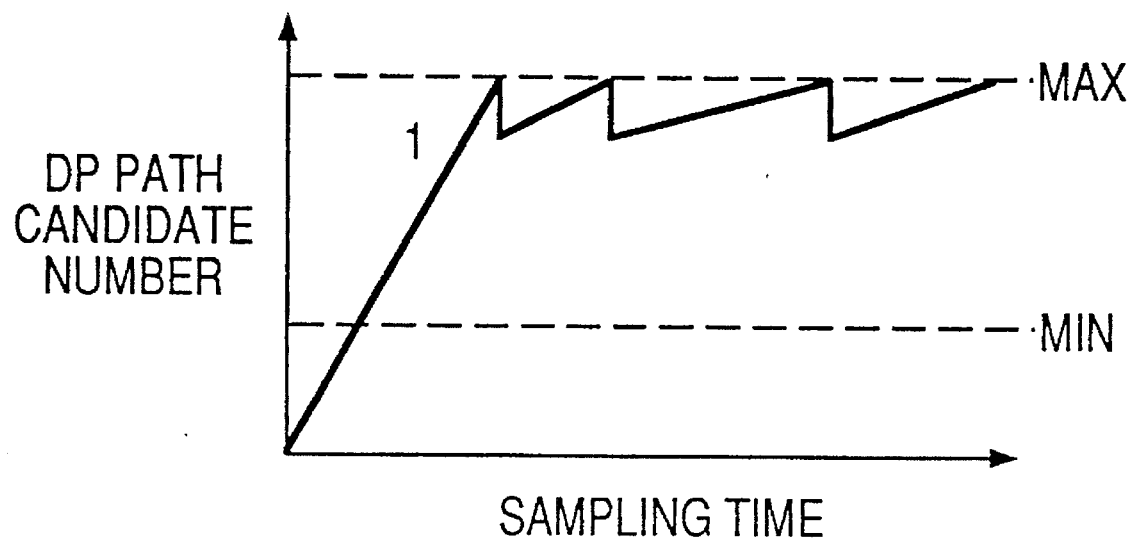
Figure 10:
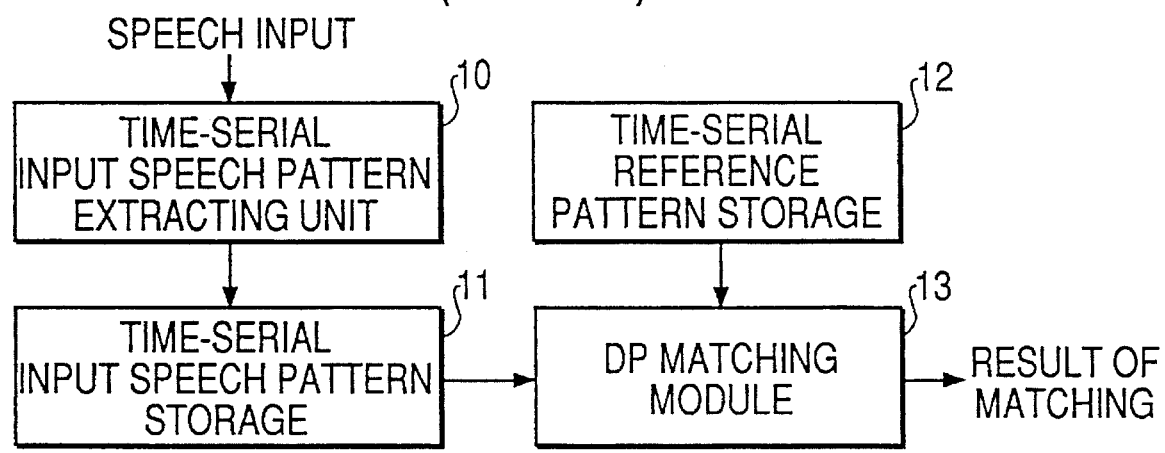
FIG. 10 is a functional block diagram for illustrating the concept underlying a prior art dynamic programming or DP matching system for speech recognition.
Figure 11A:
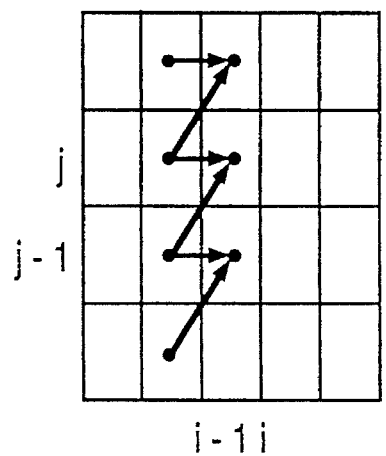
FIGS. 11A and 11B are diagrams for illustrating a DP path pruning method.
Figure 11B:
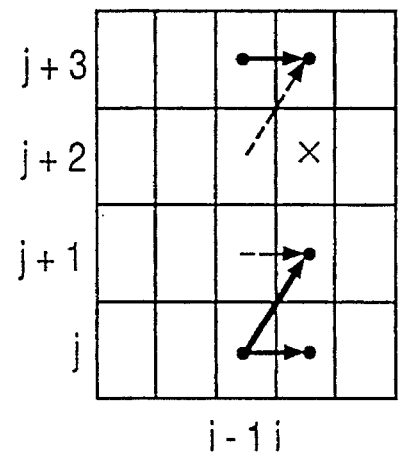
Figure 13:
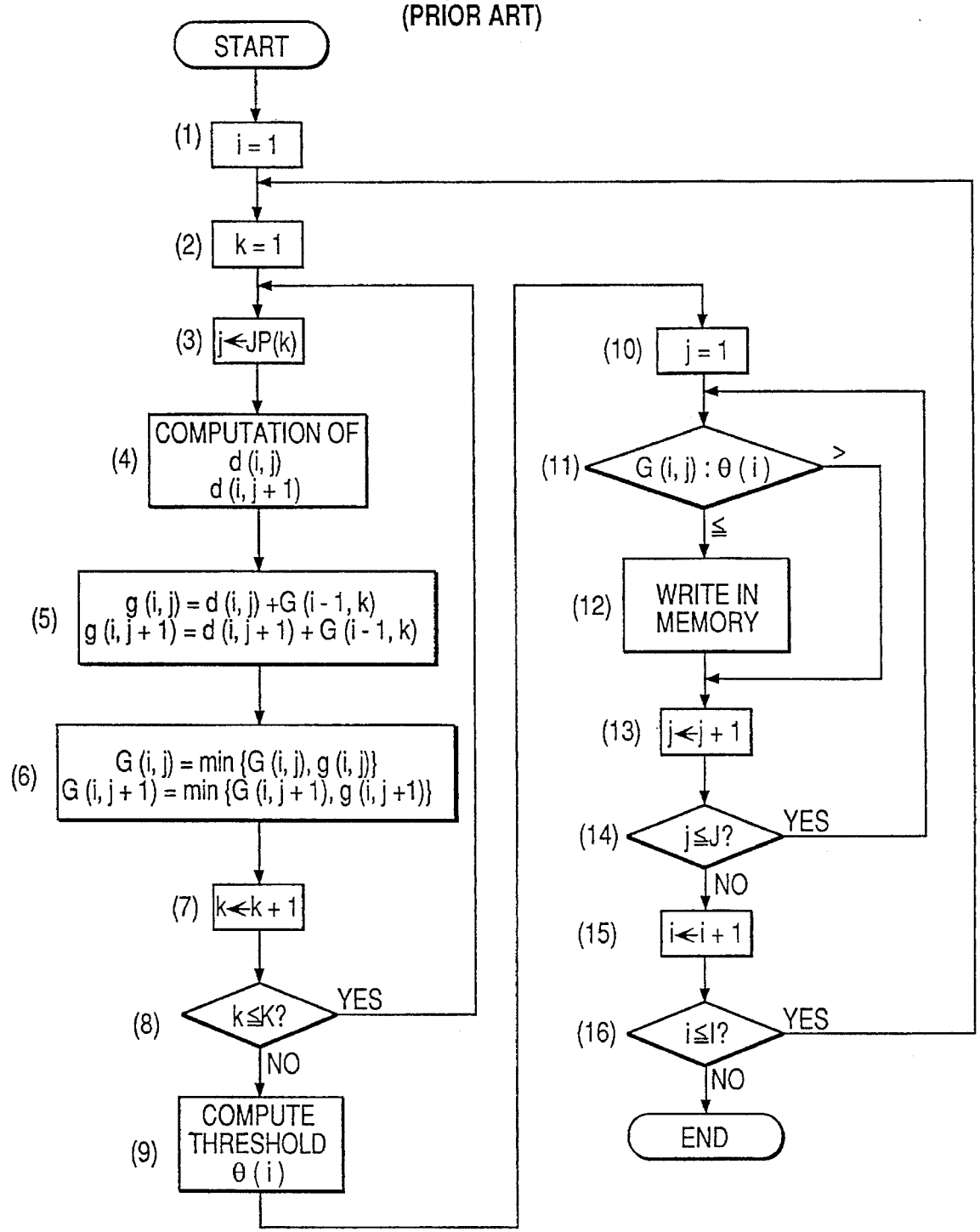
FIG. 13 is a flow chart for illustrating DP matching processors executed by the system shown in FIG. 12.

It is important to note that, in the case of the embodiments embodying the second and third aspects of the invention, the threshold value, once altered, continues to remain at the altered value. As a consequence, the time taken for the DP matching to attain the upper performance or capability limit progressively becomes longer. As such, it is noted that such time lag can be decreased according to the fourth aspect of the invention described hereinbefore, as can be seen in FIG. 9A. In that case, however, overhead increases because the number of times the threshold value is altered increases significantly. This problem can be solved according to the fifth aspect of the invention, as can be seen in FIG. 9B.

As will now be appreciated from the foregoing description, in the DP matching system for speech recognition according to the present invention, the memory for storing the candidates for the DP path can be used with an enhanced efficiency while preventing the matching performance from being lowered.

Many features and advantages of the present invention are apparent from the detailed specification, and thus, it is intended by the appended claims to cover all such features and advantages of the system which fall within the true spirit and scope of the invention. Further, since numerous modifications and changes will readily occur to those skilled in the art, it is not desired to limit the invention to the exact constructions and operations illustrated and described. Accordingly, all suitable modifications and equivalents which may be resorted to are meant to fall within the scope of the invention.

I claim:

1. A dynamic programming matching system for speech recognition, comprising:

means for extracting time-serial input speech patterns from an utterance;

a first memory for storing said time-serial input speech patterns;

a second memory for storing time-serial reference speech patterns;

dynamic programming matching means for computing cumulative values corresponding to inter-pattern distances between said time-serial input speech patterns and said time-serial reference speech patterns, respectively;

control means for controlling said dynamic programming matching means by comparing said cumulative values for said input speech patterns with a threshold value for subsequent matching processes, said control means also producing a number corresponding to the quantity of dynamic programming paths remaining at every time point a speech pattern is inputted; and threshold value altering means for altering said threshold value to produce an altered threshold value that is dependent on said number corresponding to the quantity of dynamic programming paths remaining at every time point a speech pattern is inputted, wherein at the same time that said threshold value is altered by said threshold value altering means, said dynamic programming matching means repeats computation of said cumulative values.

2. A dynamic programming matching system for speech recognition according to claim 1, wherein said threshold value altering means alters said threshold value in dependence on a relation between a first number corresponding to a first quantity of dynamic programming paths for a first speech pattern inputted at a first time point as produced by said control means and a second number corresponding to a second quantity of dynamic programming paths at a second time point as produced by said control means.

3. A dynamic programming matching system for speech recognition according to claim 2, wherein said dynamic programming matching means computes said cumulative values at the same time point that said threshold value is altered by said threshold value altering means.

4. A dynamic programming matching system for speech recognition according to claim 3, wherein said threshold value altering means alters said threshold value based on the threshold value at a current time point and a change which the threshold value at said current time point is to undergo, said change based on a number of remaining dynamic programming paths.

5. A dynamic programming matching system for speech recognition according to claim 2, wherein said threshold value altering means alters said threshold value based on the threshold value at a current time point and a change which the threshold value at said current time point is to undergo, said change based on a number of remaining dynamic programming paths.

6. A dynamic programming matching system for speech recognition according to claim 1, wherein said threshold value altering means alters said threshold value based on the threshold value at a current time point and a change which the threshold value at said current time point is to undergo, said change based on a number of remaining dynamic programming paths.

7. A dynamic programming matching system for speech recognition according to claim 1, wherein said threshold value altering means alters said threshold value based on the threshold value at a current time point and a change which the threshold value at said current time point is to undergo, said change based on a number of remaining dynamic programming paths.

8. A dynamic programming matching system for speech recognition according to claim 1, wherein said threshold value altering means alters said threshold value based on said time-serial reference patterns at time points along a time continuum of said time-serial reference patterns.

* * * * *

UNITED STATES PATENT AND TRADEMARK OFFICE
CERTIFICATE OF CORRECTION

PATENT NO. : 5,577,162
DATED : Nov. 19, 1996
INVENTOR(S) : YAMAZAKI

It is certified that error appears in the above-indentified patent and that said Letters Patent is hereby corrected as shown below:

TITLE PAGE:

[56] References Cited, add the following:

4,624,008  11/1986  Vensko et al. ............ 381/43
    4,866,778  09/1989  Baker .................. 381/43

FOREIGN PATENT DOCUMENTS 40 02 336  08/1990  Germany

[57] ABSTRACT, line 9, delete "the" (second occurrence); and after "When" insert --the--.

Col. 1,    line 39, change "made reference to" to --made to--;
             line 47, delete "for".

Col. 2,    line 8, after "formulas" insert --:--.

Col. 4,    line 53, delete "still".

Col. 5,    line 42, change "point;" to --point.--.

Col. 6,    line 32, after "sequence to" insert --alter--.

Col. 7,    line 24, change "distance" to --distances--;
             line 46, change "A" to --a--.

Col. 8,    line 8, after "formula" insert --:--.

UNITED STATES PATENT AND TRADEMARK OFFICE
CERTIFICATE OF CORRECTION

PATENT NO. : 5,577,162
DATED : Nov. 19, 1996
INVENTOR(S) : YAMAZAKI

It is certified that error appears in the above-indentified patent and that said Letters Patent is hereby corrected as shown below:

Col. 9, line 20, in the formula, change "/22" to --/2--.

Col. 10, line 1, delete "to";
line 2, after "is" (first occurrence) insert --,--.

Signed and Sealed this

Eighth Day of July, 1997

Attest:

BRUCE LEHMAN

*Attesting Officer*   *Commissioner of Patents and Trademarks*